United States Patent
O'Brien et al.

(10) Patent No.: US 10,099,850 B2
(45) Date of Patent: *Oct. 16, 2018

(54) CONTAINERS AND MATERIALS WITH IMPROVED PUNCTUREABILITY

(71) Applicant: Printpack Illinois, Inc., Elgin, IL (US)

(72) Inventors: Patrick L. O'Brien, Toano, VA (US); Rabeh Elleithy, Williamsburg, VA (US); Harold Stephen Bowen, Hayes, VA (US)

(73) Assignee: Printpack Illinois, Inc., Elgin, IL (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/481,404

(22) Filed: Apr. 6, 2017

(65) Prior Publication Data
US 2017/0210552 A1    Jul. 27, 2017

Related U.S. Application Data

(63) Continuation of application No. 14/034,298, filed on Sep. 23, 2013, now Pat. No. 9,657,155.
(Continued)

(51) Int. Cl.
*B65D 85/804* (2006.01)
*B65D 21/02* (2006.01)
(Continued)

(52) U.S. Cl.
CPC ......... *B65D 85/8043* (2013.01); *B65D 21/02* (2013.01); *B65D 77/20* (2013.01);
(Continued)

(58) Field of Classification Search
CPC ................................ B65D 85/8043
See application file for complete search history.

(56) References Cited

U.S. PATENT DOCUMENTS 2,614,727 A   10/1952   Robinson
3,357,590 A   12/1967   Safford
(Continued)

FOREIGN PATENT DOCUMENTS

EP     0265075 A2   4/1988
EP     0278470 A2   9/1988
(Continued)

OTHER PUBLICATIONS

A photo of a Swiss Miss cup shaped container, undated, admitted prior art.
(Continued)

*Primary Examiner* — Viren A Thakur
*Assistant Examiner* — Thanh H Nguyen
(74) *Attorney, Agent, or Firm* — Eversheds Sutherland (US) LLP (57) ABSTRACT

The present description includes containers having an improved puncture design that can be punctured without substantial deformation of the container. Such containers are particularly suitable for use in preparing beverages using automatic machines, particularly those used for preparation of single serve beverages. Also provided are thermoplastic materials having improved punctureability for use in containers, containers for preparation of a beverage, and methods for preparing a beverage using such containers.

21 Claims, 3 Drawing Sheets

Related U.S. Application Data (60) Provisional application No. 61/811,397, filed on Apr. 12, 2013.

(51) Int. Cl.
    *C08K 3/34* (2006.01)
    *B65D 77/20* (2006.01)
    *B65D 77/22* (2006.01)

(52) U.S. Cl.
    CPC .............. *B65D 77/22* (2013.01); *C08K 3/34* (2013.01); *Y10T 428/1397* (2015.01)

(56) References Cited

U.S. PATENT DOCUMENTS

| | | |
|---|---|---|
| 3,935,955 A | 2/1976 | Das |
| D240,019 S | 5/1976 | Taylor |
| D241,228 S | 8/1976 | Boduch |
| D260,967 S | 9/1981 | Taylor |
| D270,332 S | 8/1983 | Gaunt |
| D272,418 S | 1/1984 | Gruodis et al. |
| 4,832,201 A * | 5/1989 | Kenyon, II ........ B65D 77/2024 206/515 |
| 4,859,337 A | 8/1989 | Woltermann |
| 4,925,048 A | 5/1990 | Noack |
| D330,514 S | 1/1992 | Edwards |
| D327,845 S | 7/1992 | Behm et al. |
| D330,330 S | 10/1992 | Behm et al. |
| 5,232,120 A | 8/1993 | Dunken et al. |
| 5,325,765 A | 7/1994 | Sylvan et al. |
| D351,790 S | 10/1994 | Haindl |
| 5,375,719 A | 12/1994 | Mittmann et al. |
| 5,419,436 A | 5/1995 | Powell |
| D364,564 S | 11/1995 | Moore |
| D380,383 S | 7/1997 | Wiemann et al. |
| D390,460 S | 2/1998 | Schmidt |
| D398,528 S | 9/1998 | Wiemann et al. |
| 5,840,189 A | 11/1998 | Sylvan et al. |
| 5,992,632 A | 11/1999 | Karren |
| 6,024,244 A | 2/2000 | Hicks |
| 6,086,931 A | 7/2000 | Whiteford |
| 6,134,832 A | 10/2000 | Bokmiller et al. |
| 6,138,862 A | 10/2000 | Tai |
| D435,216 S | 12/2000 | Paoloski |
| D438,794 S | 3/2001 | Miles et al. |
| D452,434 S | 12/2001 | Sweeney |
| 6,440,256 B1 | 8/2002 | Gordon et al. |
| D474,110 S | 5/2003 | Sweeney |
| D474,111 S | 5/2003 | Lazaris |
| 6,589,577 B2 | 7/2003 | Lazaris |
| 6,607,762 B2 | 8/2003 | Lazaris et al. |
| 6,645,537 B2 | 11/2003 | Sweeney et al. |
| 6,683,125 B1 | 1/2004 | Augestad et al. |
| 6,810,788 B2 | 11/2004 | Hale |
| 6,837,377 B2 | 1/2005 | Shuert |
| D502,362 S | 3/2005 | Lazaris et al. |
| D502,870 S | 3/2005 | Bennett et al. |
| D504,814 S | 5/2005 | Bretz et al. |
| D519,831 S | 5/2006 | De Clair et al. |
| D522,368 S | 6/2006 | Darr et al. |
| D528,422 S | 9/2006 | Darr et al. |
| D530,615 S | 10/2006 | Darr et al. |
| D532,293 S | 11/2006 | Martin |
| D532,307 S | 11/2006 | Durand |
| D541,147 S | 4/2007 | LaMasney |
| 7,204,056 B2 | 4/2007 | Sieverding |
| D554,507 S | 11/2007 | Laupie |
| D554,508 S | 11/2007 | YunFu |
| D574,242 S | 8/2008 | Lin |
| D577,288 S | 9/2008 | Wilson et al. |
| D595,581 S | 7/2009 | Brunson |
| D603,221 S | 11/2009 | Liu et al. |
| D605,502 S | 12/2009 | Honda et al. |
| D606,363 S | 12/2009 | Aardenburg |
| 7,624,535 B2 | 12/2009 | Schmidt |
| 7,624,673 B2 | 12/2009 | Zanetti |
| D607,329 S | 1/2010 | Diss |
| 7,677,435 B2 | 3/2010 | Stahlecker |
| D616,704 S | 6/2010 | Hou |
| D620,310 S | 7/2010 | Lundberg |
| D622,147 S | 8/2010 | Pedmo |
| D623,063 S | 9/2010 | Pedmo |
| 7,789,255 B2 | 9/2010 | Zoppas |
| D628,476 S | 12/2010 | Vang |
| D628,883 S | 12/2010 | Stephens |
| D630,947 S | 1/2011 | Mashouf |
| 7,891,513 B2 | 2/2011 | Mody et al. |
| D647,484 S | 5/2011 | Winkler |
| 7,981,451 B2 | 7/2011 | Ozanne |
| D643,734 S | 8/2011 | Perez |
| D645,340 S | 9/2011 | Menard et al. |
| D647,398 S | 10/2011 | Winkler |
| D647,399 S | 10/2011 | Winkler |
| D648,212 S | 11/2011 | Golota et al. |
| D651,096 S | 12/2011 | Nakagiri |
| D651,901 S | 1/2012 | Miller et al. |
| 8,127,663 B2 | 3/2012 | Nottingham et al. |
| D686,916 S | 7/2013 | O'Brien et al. |
| D687,297 S | 8/2013 | O'Brien et al. |
| D700,839 S | 3/2014 | O'Brien et al. |
| 2002/0112983 A1 | 8/2002 | Padovani |
| 2002/0134701 A1 | 9/2002 | Olsthoorn et al. |
| 2003/0222089 A1 | 12/2003 | Hale |
| 2004/0173565 A1 | 9/2004 | Semersky et al. |
| 2005/0017013 A1 | 1/2005 | Peisach et al. |
| 2005/0051478 A1 | 3/2005 | Karanikos |
| 2005/0173287 A1 | 8/2005 | Smith et al. |
| 2005/0255678 A1 | 11/2005 | Kato |
| 2007/0161739 A1 | 7/2007 | Helland et al. |
| 2009/0162683 A1 | 6/2009 | Douard |
| 2009/0175986 A1 | 7/2009 | Doglioni |
| 2009/0020301 A1 | 8/2009 | Beekman et al. |
| 2009/0194546 A1 | 8/2009 | Lane |
| 2010/0018889 A1 | 1/2010 | Korpanty et al. |
| 2010/0064899 A1 | 3/2010 | Aardenburg |
| 2010/0072165 A1 | 3/2010 | Schau |
| 2010/0239717 A1 | 9/2010 | Yaokim |
| 2010/0288131 A1 | 11/2010 | Kilber |
| 2010/0288133 A1 | 11/2010 | Litzka et al. |
| 2010/0303964 A1 | 12/2010 | Beaulieu et al. |
| 2010/0303965 A1 | 12/2010 | Mariller |
| 2010/0317779 A1 | 12/2010 | Pham et al. |
| 2011/0005399 A1 | 1/2011 | Epars |
| 2011/0041702 A1 | 2/2011 | Yoakim |
| 2011/0076361 A1 | 3/2011 | Peterson et al. |
| 2011/0142996 A1 | 6/2011 | Krüger |
| 2011/0147392 A1 | 6/2011 | Trude et al. |
| 2011/0151075 A1 | 6/2011 | Peterson |
| 2011/0240506 A1 | 10/2011 | D'Amato |
| 2011/0259205 A1 | 10/2011 | Delorme |
| 2011/0283890 A1 | 11/2011 | Scrivani |
| 2011/0305801 A1 | 12/2011 | Beer |
| 2012/0006205 A1 | 1/2012 | Vanni |
| 2012/0055832 A1 | 3/2012 | Riethmueller |
| 2012/0058226 A1 | 3/2012 | Winkler |
| 2012/0097602 A1 | 4/2012 | Tedford |
| 2012/0121764 A1 | 5/2012 | Lai et al. |
| 2012/0121768 A1 | 5/2012 | Lai et al. |
| 2012/0171332 A1 | 7/2012 | Lai et al. |
| 2012/0201933 A1 | 8/2012 | Dran et al. |

FOREIGN PATENT DOCUMENTS

| | | |
|---|---|---|
| EP | 0615921 A1 | 11/1994 |
| EP | 0953602 A1 | 3/1999 |
| EP | 2444339 A1 | 4/2012 |
| EP | 2572609 A1 | 3/2013 |
| JP | 09176328 A | 7/1997 |
| JP | 10273569 | 10/1998 |
| WO | 2008136026 | 11/2008 |
| WO | 2012011053 A1 | 1/2012 |
| WO | 2012055751 | 5/2012 |
| WO | 2012122329 | 9/2012 |

(56) References Cited

FOREIGN PATENT DOCUMENTS

OTHER PUBLICATIONS

International Preliminary Report on Pantentability for International Application No. PCT/US2014/033315, dated Aug. 31, 2015 (14 pages).
Second Written Opinion for International Application No. PCT/US2014/033315, dated Mar. 12, 2015 (5 pages).
Third Written Opinion for International Application No. PCT/US2014/033315, dated Jun. 18, 2015 (4 pages).
International Search Report and First Written Opinion for International Application No. PCT/US2014/033315, dated Oct. 15, 2014 (18 pages).
Mubarek et al., Effect of nucleating agents and pigments on crystallisation, morphology, and mechanical properties of polypropylene, Jul. 2000, Maney Online, vol. 29, Issue 7. http://www.maneyonline.com/doi/abs/10.1179/146580100101541111.

* cited by examiner

CONTAINERS AND MATERIALS WITH IMPROVED PUNCTUREABILITY

CROSS-REFERENCE TO RELATED APPLICATIONS

The present application is a continuation of U.S. patent application Ser. No. 14/034,298, filed on Sep. 23, 2013, which claims priority under 35 U.S.C. § 119(e) to U.S. Provisional Application No. 61/811,397 filed on Apr. 12, 2013, the disclosures of which are incorporated herein by reference in their entirety.

BACKGROUND

The present application relates generally to the field of containers for preparation of beverages, especially coffee and tea. These containers commonly are referred to as cartridges, cups, capsules, or pods, and are particularly suitable for use in the preparation of a single-serve beverage.

In recent years, single-serve beverage machines have become popular in homes and businesses as a quick and convenient manner of brewing beverages. These machines generally brew coffee, tea, or other hot beverages through polymer containers that may have integral filters and are filled with coffee grinds, tea leaves, or other soluble products. Upon brewing of these products, the container may be easily discarded so that the machine is available for preparation of subsequent beverages. These containers thereby enable users to customize their beverages and also enjoy freshly brewed beverages quickly and easily.

Although convenient, existing containers used for the preparation of beverages have numerous drawbacks. For example, many commercially available containers are prepared using materials that are less easily recycled. This is due at least in part due to the structural characteristics that are required for these containers. For example, the containers must be sufficiently strong to permit puncturing of the base of the container without substantial deformation of the container. Thus, there exists a need for a structure that permits use of more easily recycled materials while still having sufficient structural integrity.

SUMMARY OF THE DESCRIPTION

Embodiments of the present description address the above-described needs by providing a container including a substantially circular base; a frustoconically shaped wall extending therefrom and defining a cavity therein; and a stacking shoulder which intersects and extends laterally from the wall. The base includes an annular support structure with a continuous puncture region therein, the continuous puncture region being sized and shaped to permit a puncture therein without interference and without substantial deformation of the container. The annular support structure desirably is positioned an effective distance from the edge of the base to increase the punctureability of the base in the continuous puncture region.

Also provided in embodiments herein are containers for preparation of a beverage using the above-described container and methods for preparing a beverage using such containers.

DETAILED DESCRIPTION

Embodiments of the present application address the above-described needs by providing a container for preparation of a beverage. As used herein, the term "container" is synonymous with cartridges, cups, capsules, pods, and the like, that may be used in the preparation of a beverage.

The container generally comprises a cup-shaped container with a base and a frustoconically shaped sidewall defining an opening. In an embodiment, the base includes an annular support structure. A continuous puncture region disposed within the annular support structure is configured to permit the container base to be punctured in the continuous puncture region during the preparation of the beverage. The annular support structure desirably is positioned an effective distance from the edge of the base to increase the punctureability of the base in the continuous puncture region.

An exemplary embodiment of a container 10 is further illustrated in FIGS. 1-4. The container 10 comprises the base 12 and the frustoconically shaped sidewall 14 defining an opening 16. The sidewall 14 may include a radially outwardly protruding lip 18 surrounding the opening 16. In one aspect, the radially outwardly protruding lip 18 further comprises a stacking shoulder 19 that intersects and extends laterally from the sidewall 14.

The base 12 includes an annular support structure 20 with a continuous puncture region 22 therein. The annular support structure 20 desirably is positioned an effective distance away from the edge 24 of the base 12.

Figure 1:
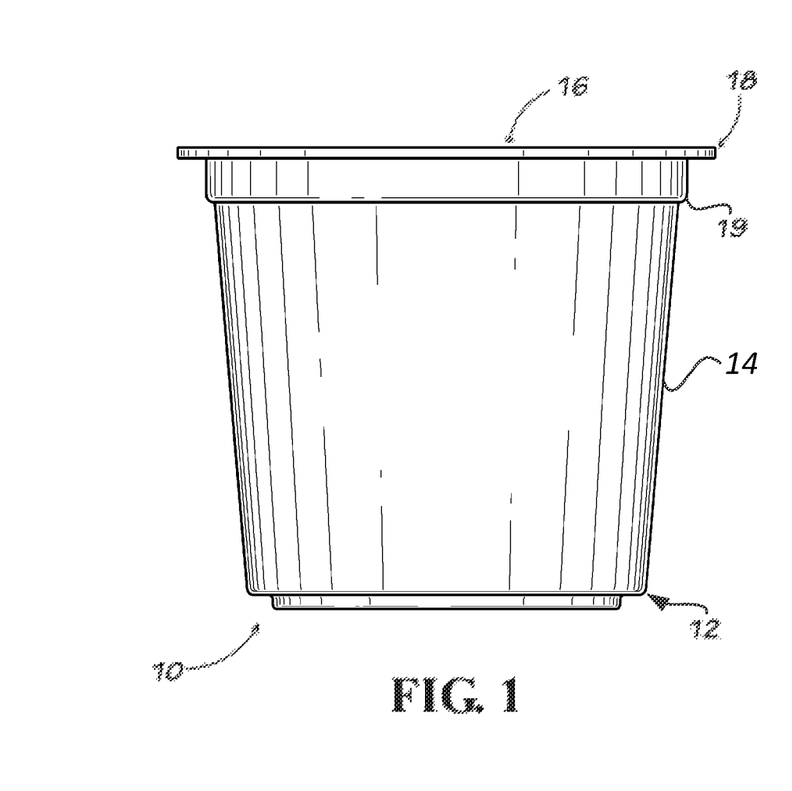
FIG. 1 is a side view of an embodiment of a container according to a first embodiment.
Figure 2:
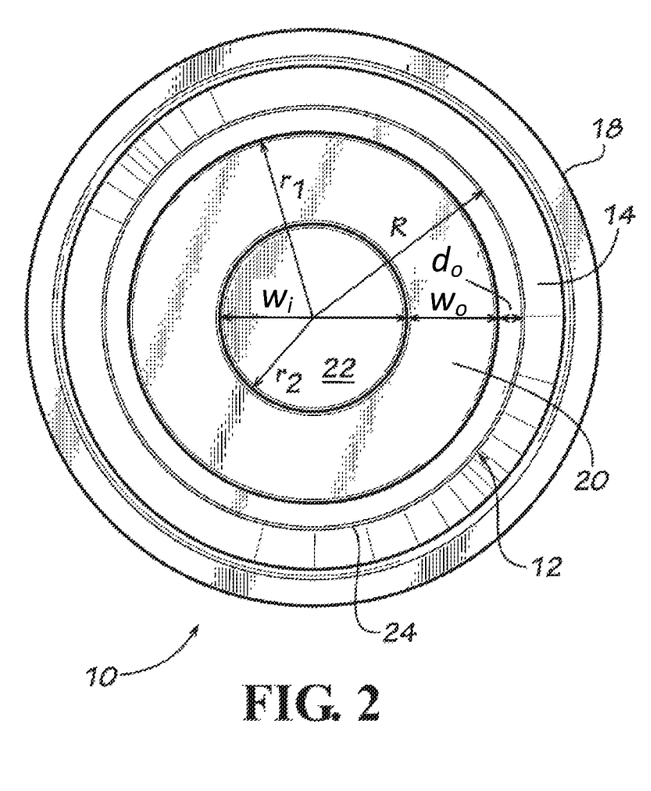
FIG. 2 is a bottom view the container illustrated in FIG. 1.
Figure 3:
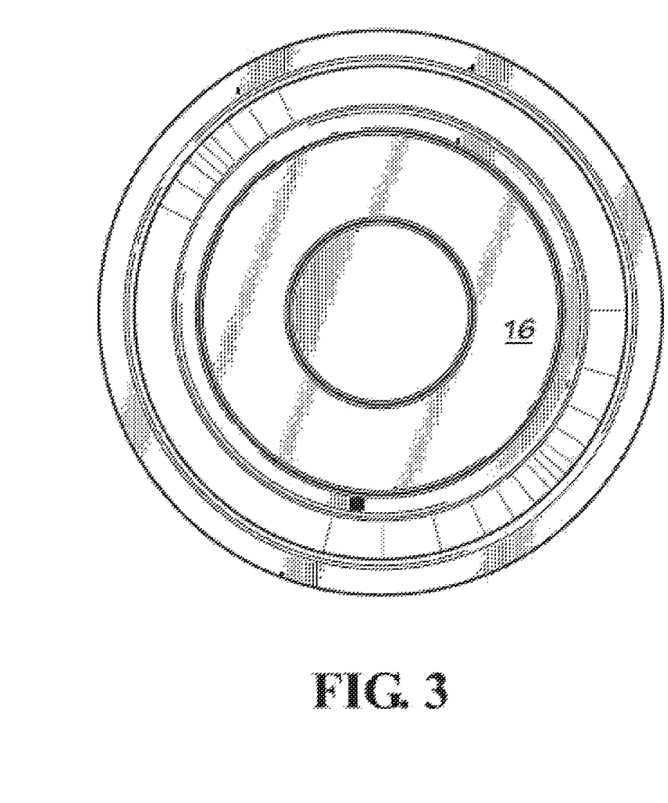
FIG. 3 is a top view of the container illustrated in FIG. 1.
Figure 4:
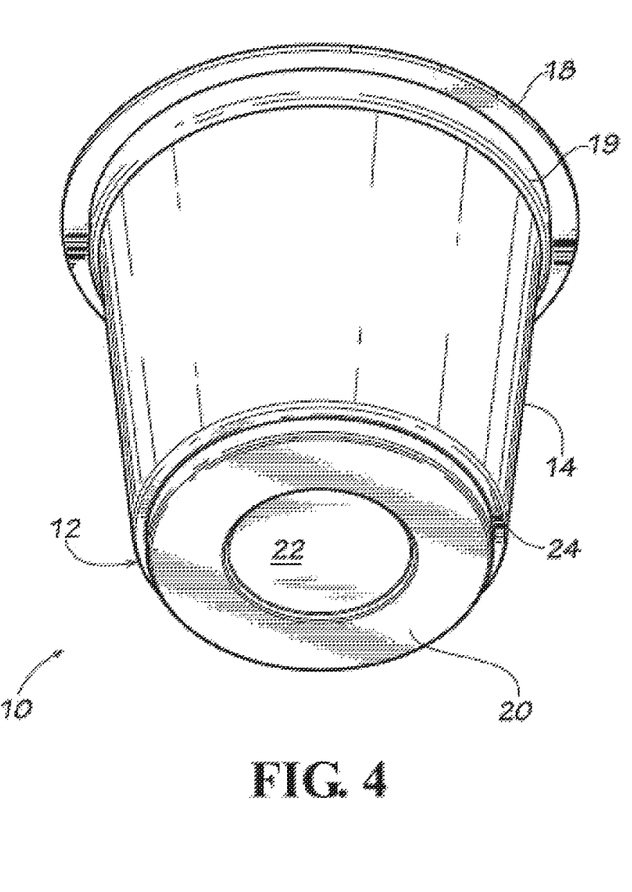
FIG. 4 is a forward lower perspective view of the container illustrated in FIG. 1.

The continuous puncture region disposed inside the annular support structure 20 is configured to permit the puncture of the container base at any position in the continuous puncture region 22 during preparation of the beverage. Although the presently described embodiment of annular support structure 20 is an annular shape, other shapes also may be used (e.g., elliptical, triangular, square, hexagonal, heptagonal, octagonal, and the like), provided the structure does not interfere with puncturing of the base in the continuous puncture region 22 and is positioned an effective distance from the edge 24 of the base. Those skilled in the art will appreciate, however, that the annular shaped support structure is particularly suitable for defining a continuous puncture region that may be punctured at any position, thereby allowing the container to be positioned within the beverage machine without regard for the position of the puncture region.

In embodiments, the annular support structure may comprise more than one annular shape. For example, the annular support structure may comprise a first annular shape and a second annular shape positioned inside the first annular shape and outside the continuous puncture region. In embodiments, the first annular support structure and the second annular support structure have substantially the same dimensions (i.e., width and height). Those skilled in the art will appreciate, however, that the dimensions of the first annular support structure and second annular support structure may be different (i.e., different widths and the like).

Not wishing to be bound by any theory, the position of the annular support structure an effective distance from the edge of the base changes the mode of failure of the container and increases the rigidity of the base, thereby improving the punctureability of the base in the continuous puncture region. In exemplary embodiments, an effective distance from the edge of the base is from about 1 to about 10 mm, from about 1 to about 5 mm, from about 1.5 to about 2.5 mm, or from about 2.0 to about 2.5 mm. For example, in an embodiment the annular support structure may be positioned about 2.3 mm from the edge of the base.

Figure 6:
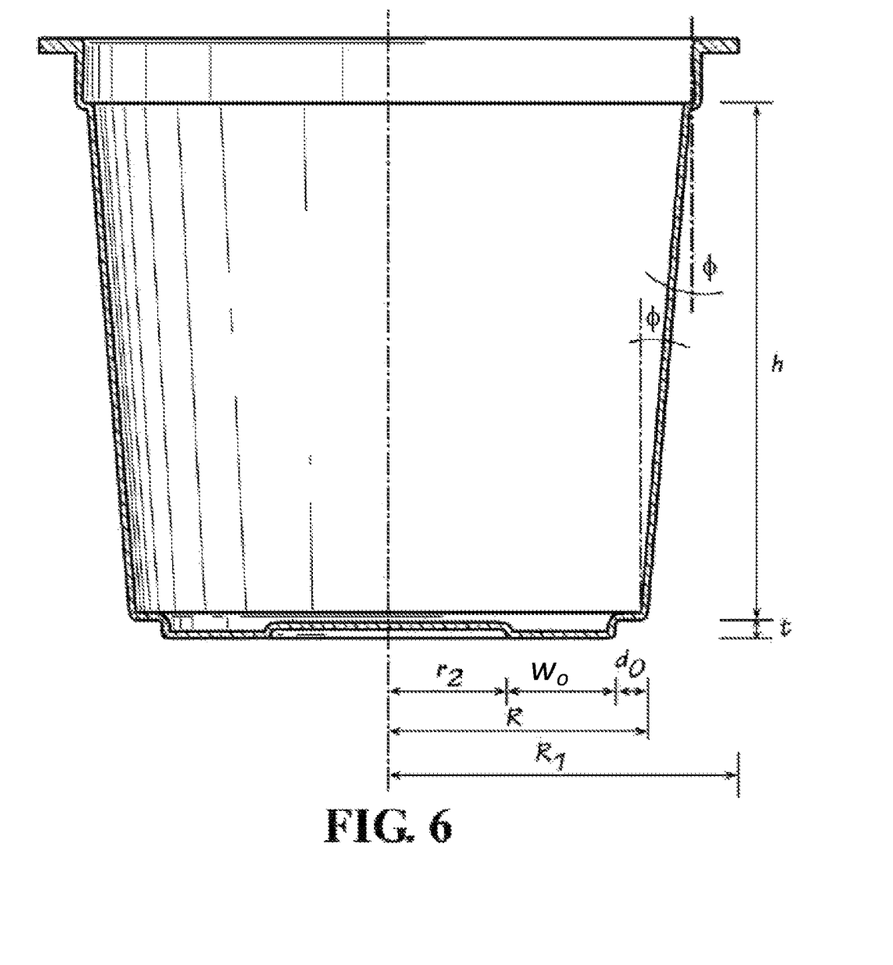
FIG. 6 is a cross-sectional side view of an embodiment of the container illustrated in FIG. 1.

In embodiments, the container further comprises an inner support structure on the base disposed in the center of the continuous puncture region, such that the continuous puncture region is positioned between the annular support structure and the inner support structure (FIG. 6). The inner support structure may be annular in shape similar to the annular support structure, although other shapes also may be used (e.g., circular, elliptical, triangular, square, hexagonal, heptagonal, octagonal, and the like), provided the shape of the inner support structure does not interfere with the ability to puncture the base in the continuous puncture region.

Figure 5A:
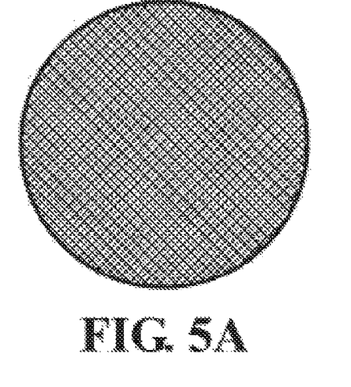
FIG. 5A and FIG. 5B are schematic illustrations of a design that may be applied to the inner surface of a cup base according to embodiments.
Figure 5B:
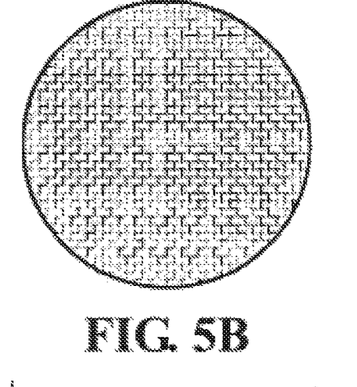

In embodiments, the container further comprises other features to facilitate the punctureability of the base in the continuous puncture region. For example, in an embodiment the container may include a feature in the inner surface of the base of the container. The feature may be effective to weaken the material of the base in the continuous puncture region during its puncture without sacrificing its strength, for example, by providing stress concentrators. Two exemplary embodiments of the feature are illustrated in FIGS. 5A and 5B, which illustrate the designs that may be imprinted in the inner surface of the base of the container. Other designs also may be used.

In an embodiment (FIG. 6), the container may be further characterized by the following mathematical relationship:

$$h=(R_1-R)\cdot\tan(90-\Phi)$$

wherein h is the height of the container from the base 12 to the stacking shoulder 19, $R_1$ is the inner radius of the container at the stacking shoulder 19, R is the radius of the base 12 at the edge 24 of the base, and $\Phi$ is the approach angle.

The container also can further be characterized by the dimensions of the base features (FIG. 2 and FIG. 6): $r_1$ is the radius of the base 12 to the outer portion of the annular support structure 20, $r_2$ is the radius of the base 12 to the inner portion of the annular support structure 20, $d_o$ is the effective distance from the edge 24 of the base to the annular support structure 20, $w_o$ is the width of the annular support structure 20, $w_i$ is the width of the continuous puncture region 22 of the base 12, and t is the height of the annular support structure 20. Accordingly, in certain embodiments the base 12 is further characterized by the following mathematical relationships:

$$d_o=R-r_1>0.01$$

$$w_o=r_1-r_2>0.01$$

$$R>r_1>r_2$$

$$w_i=2\cdot r_2$$

In embodiments, $r_1$ and $r_2$, independent from one another, may be from about 0.1 to about 10.0 mm. For example, in embodiments R may be 18.8 mm, $r_1$ may be 9.4 mm, and $r_2$ may be 8.25 mm, such that $d_o$ is 9.4 mm, $w_o$ is and 1.15 mm, $w_i$ is 16.5 mm, and t is 0.65 mm. Exemplary ranges of the foregoing variables are summarized in the table below.

| Dimension | | Exemplary Ranges |
|---|---|---|
| height of the container | h | 20.0 mm-100.0 mm |
| inner radius of the container at the stacking shoulder | $R_1$ | 11.0 mm-55.0 mm |
| radius of the base | R | 10.0 mm-50.0 mm |
| approach angle | $\Phi$ | 2 degrees-10 degrees |
| effective distance from edge of base to annular support structure | $d_o$ | 0.5 mm-10.0 mm |
| outer radius of annular support structure | $r_1$ | 4.5 mm-49.5 mm |
| inner radius of annular support structure | $r_2$ | 4.0 mm-24.5 mm |
| width of annular support structure | $W_o$ | 0.5 mm-25.0 mm |
| height of the annular support structure | t | 0.5 mm-5.0 mm |

In embodiments, a self-supporting filter element (not illustrated) known to those skilled in the art may be disposed in the container and either removably or permanently joined to an interior surface of the container. For example, the filter may be in the shape of an inverted hollow cone having a curved wall tapering evenly from a rim surrounding an opening. The filter element then may be placed in the container so that the apex of the cone is supported on and slightly flattened by the base of the container, thereby enlarging the volume within the cone and providing beneficial support for the filter element.

In embodiments, the container provided herein further comprises a pierceable cover in a hermetically sealed relationship with the lip of the container, closing the opening to form a cartridge. The cover desirably is formed of an impermeable and imperforate material that may be pierced with an instrument, such as a tubular needle, through which hot water is delivered for preparation of the beverage. For example, in embodiments the cover may comprise a polymer film or a foil heat-sealed to the lip of the container.

In embodiments, the containers may be prepared by molding and thermoforming the container from a thermoplastic material. Desirably, the thermoplastic material is substantially impermeable and imperforate. Non-limiting examples of suitable thermoplastic materials include polyolefins such as polypropylene and polyethylene, polystyrene, nylon, and other polymers. In particular embodiments, it is particularly desirable that the thermoplastic material be a bio-based resin, readily recyclable, and/or comprise at least a portion of recycled material. For example, in an embodiment the thermoplastic material may comprise a recycled polypropylene base resin.

In embodiments, the thermoplastic material may be blended with one or more additives to impart the desired mechanical and thermal properties to the container. For example, in embodiments the thermoplastic material may be blended with one or more additives to impart the desired stiffness to the container. In an embodiment, the additive comprises an immiscible polymer that may function as a stress concentrator by hindering the natural ability of the thermoplastic material to deform plastically and promoting controlled crack propagation. Non-limiting examples of immiscible polymers that may be suitable for use with a thermoplastic material comprising polypropylene include acrylics, styrenics, or their blends and copolymers with polyolefins. In an embodiment, the additive comprises a nucleating agent. In an embodiment, a second additive comprises a metallic stearate, non-limiting examples of which include calcium stearate, magnesium stearate, zinc stearate, and combinations thereof. Other non-limiting examples of additives include calcium carbonate, talc, clays, and nano grades of these additives.

In embodiments, the thermoplastic material comprises a blend of a thermoplastic polymer, a nucleating agent, and a second additive selected from the group consisting of calcium carbonate, talc, clay, and combinations thereof. For example, the nucleating agent may be present in the thermoplastic material in an amount from about 0.5 to about 5% by weight or about 0.5 to about 2.5% by weight, and the second additive may be present in an amount from about 5 to about 25% by weight, about 5 to about 20% by weight, about 7 to about 18% by weight, about 7 to about 12% by weight, or about 9% by weight. For example, in embodiments the thermoplastic material may comprise a polypropylene, a nucleating agent in an amount from about 0.5 to about 2.5% by weight, and a second additive (e.g., talc) in an amount from about 7 to about 12% by weight.

In embodiments, the thermoplastic material comprises a monolayer or a multilayer material having at least two layers. Such materials are known to those skilled in the art. For example, the thermoplastic material may include a multilayered film having one or more layers formed of a thermoplastic polymer and a barrier layer configured to improve the barrier properties of the material. The multilayered film also may include one or more tie layers disposed between the barrier layer and adjacent thermoplastic polymer layers and, optionally, one or more layers of regrind. Non-limiting examples of barrier layers commonly used in the art include ethylene vinyl alcohol (EVOH) and nylon, with the amount of the additive in the barrier layer being determined at least in part by the particular application for which the container will be used.

For example, in an exemplary embodiment the thermoplastic material is a multilayered film having five (5) layers: thermoplastic polymer/tie layer/barrier layer/tie layer/thermoplastic polymer layer. For example, the thermoplastic polymer may be a polypropylene and the barrier layer may include EVOH. In another exemplary embodiment, the thermoplastic material is a multilayered film having seven (7) layers: thermoplastic polymer/regrind/tie layer/barrier layer/tie layer/regrind/thermoplastic polymer.

Desirably, the containers provided herein have a puncture load of less than about 6 kg. As used herein, the "puncture load" means the force required to puncture the continuous puncture region in the base of the container using a needle. It should be appreciated that the puncture load depends in part on the type of needle used to measure the puncture load of a container. For example, the puncture load measured using a dull needle generally will be greater than the puncture load measured using a sharp needle. For example, in embodiments the containers may have a puncture load measured using a sharp needle of less than about 3 kg, less than about 2.75 kg, or less than about 2.5 kg. In embodiments, the containers may have a puncture load measured using a sharp needle of about 4.2 to about 3 kg, about 2.99 to about 2.75 kg, or about 2.74 to about 2.5 kg. In embodiments, the containers may have a puncture load measured using a dull needle of less than about 5 kg. For example, the containers may have a puncture load measured using a dull needle of about 4.0 to about 5.0 kg.

In embodiments, the container may be configured to receive an insert in which the dry beverage ingredients are disposed. For example, the container may be configured to receive an insert comprising a filter cup in which are disposed the ingredients for preparing a beverage. For example, the container may further comprise a filter cup comprising a brew substance, non-limiting examples of which include coffee grinds, ground tea leaves, chocolate, flavored powders, and the like. The brew substance also may include a combination of dry milk, sugar or sugar substitute, or other flavorings to enhance the quality of the resulting beverage.

The containers embodied herein are particularly suited for use in an automatic machine, such as a coffee brewing machine. Upon placing the container in the machine, a piercing member punctures the cover to introduce pressurized hot water through the hole where it comes into contact with the beverage ingredients disposed in the filter. A second piercing member punctures the base of the container at any position in the continuous puncture region to enable the prepared beverage to flow out of the container and be dispensed into a cup or container for consumption by the consumer.

The containers provided herein also may be configured for use with other types of food products, non-limiting examples of which include dry ingredients for preparing broths, soups, and sauces that may be eaten be themselves or used to prepare a food dish.

The foregoing embodiments can be further understood and illustrated by the following non-limiting examples.

EXAMPLES

Example 1

Containers (1.9 ounces) were prepared from multi-layer sheets using various combinations of polypropylene compounds, different additives, and barrier materials. Polypropylene base resins included a high stiffness polypropylene and a homopolymer polypropylene and were used either alone or in combination with a stearate masterbatch (Stearate MB) and nucleating agent (NA).

The containers included both an annular support structure and an inner support structure with a continuous puncture region therebetween, the annular support structure being in the form of a ring and the inner support structure being in the form of a circle (i.e., the base of the container had a "donut" shape with a "pineapple" design included on the inside of the container base). The containers were then tested for punctureability with a dull needle (i.e., a needle that has a curved puncturing point rather than a pointed puncture point). When the puncturing point is curved, the load distribution during puncturing changes, resulting in a different behavior of the cups. The results for multilayer containers having seven (7) layers (Polypropylene/Regrind/Tie/Barrier/Tie/Regrind/Polypropylene) are summarized in the following table, which lists the different polypropylene formulations used in the experiments. The barrier layer included 4% EVOH.

| PP Compounds | Puncture load, Kg |
|---|---|
| High stiffness PP + 4.5% Stearate MB + 1% NA | 5.04 |
| High stiffness PP + 4.5% Stearate MB + 2% NA | 4.74 |
| Homopolymer PP + 4.5% Stearate MB + 1% NA | 4.67 |
| Homopolymer PP + 4.5% Stearate MB + 2% NA | 7.67 |

Example 2

Containers (1.9 ounces) were prepared from monolayer sheets using various combinations of polypropylene compounds and different additives. Polypropylene base resins included a high stiffness polypropylene (PP B) and a homopolymer polypropylene (PP A) and were used alone or in combination with a nucleating agent (NA), calcium carbonate, or talc. It should be noted that both polypropylene resins were nucleated; however, the concentration of nucleating agents present in the base resin are proprietary. Generally, the concentration of nucleating agents in these resins is about 0.1% (about 1000 ppm).

The containers included both an annular support structure and an inner support structure with a continuous puncture region therebetween, the annular support structure being in the form of a ring and the inner support structure being in the form of a circle. The containers were then tested for punctureability with a dull needle (i.e., a needle that has a curved puncturing point rather than a pointed puncture point) to measure the puncture load (kg) and displacement (mm). Additionally, the non-puncture rate was determined from the percentage of containers that did not puncture during testing of ten (10) cups for each type of thermoplastic material formulation.

| Thermoplastic Material[+] | Puncture load* (kg) | Displacement* (mm) | Non-puncture Rate (%) |
|---|---|---|---|
| 85% PP B + 15% Calcium Carbonate | 4.76 | 7.66 | 50 |
| 85% PP A + 15% Calcium Carbonate | 4.31 | 7.06 | 40 |
| 50% PP A + 50% PP B | 4.28 | 6.66 | 20 |
| 96% PP A + 4% PolyOne ® | 4.37 | 6.93 | 20 |
| 98% PP A + 2% NA | 4.06 | 6.65 | 10 |
| 94% PP A + 4% PolyOne ® + 2% NA | 4.69 | 6.66 | 10 |
| 49% PP A + 49% PP B + 2% NA | 4.70 | 7.42 | 10 |
| 85% PP A + 15% Talc | 4.69 | 6.70 | 0 |

[+]The concentrations are the amount of additional additive added to the base resin and do not include any additives that may be present in the supplier's proprietary blends.
*The puncture load and displacement exclude values from experiments where the container was not punctured.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A thermoplastic container, comprising:
   a substantially circular base; and
   a frustoconical wall extending from an edge of the base and defining a cavity therein,
   wherein the base comprises an annular support structure surrounding a continuous region, the annular support structure being positioned from 0.5 mm to 10 mm from the edge of the base, having a width of from 0.5 mm to 25 mm, and having a height from 0.5mm to 5 mm, relative to the edge of the base,
   wherein the annular support structure comprises inner and outer sidewalls and a support surface extending between the inner and outer sidewalls, the support surface having the width,
   wherein the base comprises an annular wall extending between the outer sidewall of the annular support structure and the edge of the base, the annular wall extending completely along a plane parallel to a plane along which the support surface of the annular support structure completely extends,
   wherein the container is formed of a thermoplastic monolayer material comprising polypropylene in an amount of at least 70 percent by weight or a thermoplastic multilayer material comprising one or more layers that comprise polypropylene in an amount of at least 70 percent by weight, and
   wherein the base is punctureable by a single needle and displays a puncture load of less than 3 kg, measured using a sharp needle comprising a pointed puncture point, or of less than 5 kg, measured using a dull needle comprising a curved puncture point.

2. The thermoplastic container of claim 1, wherein the annular support structure defines a puncture region of the base.

3. The thermoplastic container of claim 1, wherein:
   the container further comprises a stacking shoulder which intersects and extends laterally from the frustoconical wall, such that the container has a height measured from the stacking shoulder to the edge of the base, and
   a ratio of the height of the annular support structure to the height of the container is from 0.5:100 to 5:100.

4. The thermoplastic container of claim 1, wherein:
   the container further comprises a stacking shoulder which intersects and extends laterally from the frustoconical wall, and
   the frustoconical wall is free of radial protrusions or shoulders other than the stacking shoulder.

5. A thermoplastic container, comprising:
   a substantially circular base;
   a frustoconical wall extending from an edge of the base and defining a cavity therein; and
   a stacking shoulder which intersects and extends laterally from the wall, the container having a height measured from the stacking shoulder to the edge of the base;
   wherein the base comprises an annular support structure surrounding a continuous region, the annular support structure being positioned from 0.5 mm to 10 mm from the edge of the base, having a width of from 0.5 mm to 25 mm, and having a height from 0.5mm to 5 mm, relative to the edge of the base;
   wherein a ratio of the height of the annular support structure to the height of the container is from 0.5:100 to 5:100,
   wherein the base is punctureable by a single needle and displays a puncture load of less than 3 kg, measured using a sharp needle comprising a pointed puncture point, or of less than 5 kg, measured using a dull needle comprising a curved puncture point,
   wherein the annular support structure comprises inner and outer sidewalls and a support surface extending between the inner and outer sidewalls, the support surface having the width, and
   wherein the base comprises an annular wall extending between the outer sidewall of the annular support structure and the edge of the base, the annular wall extending completely along a plane parallel to a plane along which the support surface of the annular support structure completely extends.

6. The thermoplastic container of claim 5, wherein the container is formed of a thermoplastic material comprising a thermoplastic polymer selected from polypropylene, polystyrene, nylon, polyethylene, and combinations thereof.

7. The thermoplastic container of claim 5, wherein the thermoplastic container is formed of a thermoplastic monolayer material comprising polypropylene in an amount of at least 70 percent by weight or a thermoplastic multilayer material comprising one or more layers that comprise polypropylene in an amount of at least 70 percent by weight.

8. The thermoplastic container of claim 5, wherein the frustoconical wall is free of radial protrusions or shoulders other than the stacking shoulder.

9. A container for forming a beverage comprising the thermoplastic container of claim 5, and further comprising:
   a filter disposed in the cavity of the container and defining first and second chambers in the cavity;
   a beverage medium disposed in the cavity and arranged to interact with a liquid introduced into the container to form a beverage; and
   a lid attached to a rim of the container to contain the beverage medium and filter disposed therein.

10. A thermoplastic container comprising:
   a substantially circular base;
   a frustoconical wall extending from an edge of the base and defining a cavity therein; and
   a stacking shoulder which intersects and extends laterally from the wall;
   wherein the base comprises an annular support structure surrounding a continuous region, the annular support structure being positioned from 0.5 mm to 10 mm from the edge of the base, having a width of from 0.5 mm to 25 mm, and having a height from 0.5mm to 5 mm, relative to the edge of the base,
   wherein the frustoconical wall is free of radial protrusions or shoulders other than the stacking shoulder,
   wherein the base is punctureable by a single needle and displays a puncture load of less than 3 kg, measured using a sharp needle comprising a pointed puncture point, or of less than 5 kg, measured using a dull needle comprising a curved puncture point
   wherein the annular support structure comprises inner and outer sidewalls and a support surface extending between the inner and outer sidewalls, the support surface having the width, and
   wherein the base comprises an annular wall extending between the outer sidewall of the annular support structure and the edge of the base, the annular wall extending completely along a plane parallel to a plane along which the support surface of the annular support structure completely extends.

11. The thermoplastic container of claim 10, wherein the container is formed of a thermoplastic material comprising a thermoplastic polymer selected from polypropylene, polystyrene, nylon, polyethylene, and combinations thereof.

12. The thermoplastic container of claim 10, wherein the thermoplastic container is formed of a thermoplastic monolayer material comprising polypropylene in an amount of at least 70 percent by weight or a thermoplastic multilayer material comprising one or more layers that comprise polypropylene in an amount of at least 70 percent by weight.

13. The thermoplastic container of claim 10, wherein:
   the container has a height measured from the stacking shoulder to the edge of the base, and
   a ratio of the height of the annular support structure to the height of the container is from 0.5:100 to 5:100.

14. The thermoplastic container of claim 10, wherein the annular support structure defines a puncture region of the base.

15. A container for forming a beverage comprising the thermoplastic container of claim 10, and further comprising:
   a filter disposed in the cavity of the container and defining first and second chambers in the cavity;
   a beverage medium disposed in the cavity and arranged to interact with a liquid introduced into the container to form a beverage; and
   a lid attached to a rim of the container to contain the beverage medium and filter disposed therein.

16. A container for forming a beverage, comprising:
   a thermoplastic container, comprising:
      a substantially circular base; and
      a frustoconical wall extending from an edge of the base and defining a cavity therein,
      wherein the base comprises an annular support structure surrounding a continuous region, the annular support structure being positioned from 0.5 mm to 10 mm from the edge of the base, having a width of from 0.5 mm to 25 mm, and having a height from 0.5mm to 5 mm, relative to the edge of the base,
      wherein the annular support structure comprises inner and outer sidewalls and a support surface extending between the inner and outer sidewalls, the support surface having the width, and
      wherein the base comprises an annular wall extending between the outer sidewall of the annular support structure and the edge of the base, the annular wall extending completely along a plane parallel to a plane along which the support surface of the annular support structure completely extends;
   a filter disposed in the cavity of the thermoplastic container and defining first and second chambers in the cavity;
   a beverage medium disposed in the cavity and arranged to interact with a liquid introduced into the thermoplastic container to form a beverage; and
   a lid attached to a rim of the thermoplastic container to contain the beverage medium and filter disposed therein.

17. The container of claim 16, wherein the thermoplastic container is formed of a thermoplastic material comprising a thermoplastic polymer selected from polypropylene, polystyrene, nylon, polyethylene, and combinations thereof.

18. The container of claim 16, wherein:
   the thermoplastic container is formed of a thermoplastic monolayer material comprising polypropylene in an amount of at least 70 percent by weight or a thermoplastic multilayer material comprising one or more layers that comprise polypropylene in an amount of at least 70 percent by weight, and
   the base is punctureable by a single needle and displays a puncture load of less than 3 kg, measured using a sharp needle comprising a pointed puncture point, or of less than 5 kg, measured using a dull needle comprising a curved puncture point.

19. The container of claim 16, wherein the annular support structure defines a puncture region of the base.

20. The container of claim 16, wherein:
   The thermoplastic container further comprises a stacking shoulder which intersects and extends laterally from the frustoconical wall, such that the thermoplastic container has a height measured from the stacking shoulder to the edge of the base, and
   a ratio of the height of the annular support structure to the height of the thermoplastic container is from 0.5:100 to 5:100.

21. The container of claim 16, wherein:
   the thermoplastic container further comprises a stacking shoulder which intersects and extends laterally from the frustoconical wall, and the frustoconical wall is free of radial protrusions or shoulders other than the stacking shoulder.

\* \* \* \* \*